Patented Sept. 26, 1933

1,928,400

UNITED STATES PATENT OFFICE 1,928,400

PROCESS OF WATER PURIFICATION

Oliver M. Urbain, Columbus, Ohio, assignor to
Charles H. Lewis, Harpster, Ohio

No Drawing. Application February 26, 1932
Serial No. 595,437

5 Claims. (Cl. 210—2)

This invention relates to water purification and has for its object the provision of an improved process for treating sewage and industrial waste to remove the suspended matter as well as the colloidal matter therefrom.

The suspended matter in sewage and organic wastes, of course, is susceptible to removal by filtration or by any known coagulant as, for example, aluminum sulfate or ferrous sulfate. The colloidal fraction, however, is stable and incapable of removal by filtration or coagulation and must first be flocculated. The present process deals primarily with the flocculation of the colloidal matter.

The removal of the colloidal matter from sewage and organic wastes is essential in order that the biochemical oxygen demand thereof be brought down to an allowable limit.

The biochemical oxygen demand of an organic sewage is due far greater to the colloidal fraction than to the suspended matter or even the combined suspended matter and putrescible matter in true solution. It has been found, for example, in raw sewage having a ten day biochemical oxygen demand of 280, the colloidal fraction alone is responsible for a ten day biochemical oxygen demand of 170, while the suspended matter in the sewage is responsible for only a ten day biochemical oxygen demand of 81.

It is known that colloids can be flocculated by a suitable electrolyte and that complete flocculation only occurs when the colloids carry a maximum charge and have a maximum cataphoretic velocity. It has been heretofore proposed to bring the colloidal matter in solution to a maximum cataphoretic velocity by increasing the hydroxyl ion concentration of the solution to approximately pH 9.5 or 10. This has necessitated the use of large quantities of reagents and made the operation expensive. Furthermore, such high alkalinity has proved disadvantageous in the effluent of the purification process.

Depending upon the character of the water waste in which the colloids are dispersed, quantities of calcium hydroxide ranging from 1000 to 3000 pounds per million gallons of water may be required to bring the same to a pH of 9.5 and impart a complete charge and maximum cataphoretic velocity to the colloids.

The OH ions occupy a position out of keeping with their valence as they are strongly adsorbed and impart a charge far in excess of the positive charge imparted by other univalent ions such as Na and K. It is because of these facts that the colloids can be completely negatively charged by the incorporation in the solution of calcium hydroxide.

I have heretofore determined that colloids dispersed in a liquid can also have imparted thereto a maximum charge and cataphoretic velocity by the incorporation in the disperse medium of a reagent which will ionize and release inorganic anions of high valence having certain definite characteristics for adsorption by the incompletely charged colloids and my copending application Serial No. 584,904, filed January 5, 1932 is directed to the process of increasing the charge and cataphoretic velocity of colloids by such means.

The present invention is predicated on my further discovery that the charge and cataphoretic velocity of colloids in dispersion in a liquid may also be increased to a maximum by the incorporation in the liquid containing the colloids organic compounds or anions of the salts of organic acids of definite constitution.

According to the present invention, I increase the charge and cataphoretic velocity of the colloids by incorporating in the solution a polycyclic compound or salt of a polycyclic acid, the latter being somewhat more efficient than the former. A univalent cation is preferred as the antagonism is then at a minimum.

The anions of the salts of the polycyclic acids combine the negative properties of the anions with the polycyclic structure of the parent acid and are most effective.

The increase of the charge and catophoretic velocity of the colloids as pointed out is due to the adsorption by the colloids of the anions.

The polycyclic compounds which are divided into two groups, i. e., carbocyclic and heterocyclic, contain many double bonds which are in a state of vibration or are pointed inward into the center of the molecule. With the double bond is associated induced polarity and consequently points of unequal reactivity. These properties are believed responsible for the remarkable adsorbability of the polycyclic compounds by the colloids which I have discovered takes place in my process. The open chain compounds do not exhibit these properties and are not noticeably adsorbed by the colloids.

With respect to the polycyclic acids, the univalent salts of these acids are preferred for they give on ionization the polycyclic anions which are more strongly negative than the parent polycyclic compound, that is, exhibit greater electrical potential. Acids of the polycyclic compounds may be considered as formed by the replacement of hydrogen atoms of the polycyclic compounds by, A carboxyl group (—COOH)
Or a sulfonic acid group (—SO$_3$H)
Or a sulfinic acid group (—SO$_2$H)
Or a sulfenic acid group (—SOH)
Or an arsonic acid group

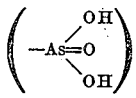

Or a phosphonic acid group (—PO$_4$H$_2$).

All of these acids replace carbonic acid in sodium carbonate. Hence to obtain the sodium salt it is only necessary to add to the acid the sodium carbonate in gram molecular equivalents. On ionization the sodium salts so formed yield the organic anion which not only possesses the properties of the parent polycyclic compound but the electrical potential properties of a negative ion.

I have found that in my process the isomers of the polycyclic compound are equally effective and that the position of the acid residue on the benzene ring is of no importance. I have further ascertained that valence is unimportant since while higher valent salts give better results than lower valent salts, the difference is only proportional to the higher molecular weight of the higher valent salts.

Exemplary polycyclic compounds for use in my process are: naphthalene sulfonic acid; carminic acid, diphenic acid and naphthoquinone.

It will be appreciated that when a water or waste such as sewage or other industrial waste is treated with the reagent as above defined, the action of the reagent is limited to the colloidal fraction and merely functions to bring the colloids to their maximum charge and cataphoretic velocity, in which condition they are susceptible of flocculation by a suitable electrolyte. A suitable electrolyte for this purpose may be defined as an ionizable salt having a cation of high valence and an anion of low valence such, for example, as stannic chloride, aluminum chloride, or ferric chloride. When the colloidal matter has been flocculated by the electrolyte which releases ions of opposite charge to the maximum charge carried by the colloids, the flocculated colloids are susceptible to coagulation the same as the suspended matter, and the step of coagulating the suspended matter normally in the sewage or waste as well as the flocculated colloidal matter can be concurrently effected by the introduction of a known coagulant, for example, aluminum sulfate or ferrous sulfate.

To avoid peptization or deflocculation due to the presence of any excess of the electrolyte, the action of the electrolyte can be terminated at will by the incorporation in the solution undergoing treatment of a controlled amount of calcium hydroxide, not more than sufficient to bring the solution to a pH of 8.5.

The quantity of the reagent, i. e., the polycyclic compound, as well as the quantity of the electrolyte and the amount of coagulant and calcium hydroxide needed for the process will depend, of course, on the character of the particular material being treated, and can best be ascertained by trial tests. As an illustration, however, in treating raw sewage having a ten day biochemical oxygen demand of 280, the reagent may well be employed in amounts varying from 200 to 400 pounds per million gallons. The electrolyte can be used within the range of from 150 to 200 pounds per million gallons, while calcium hydroxide will be used in an amount adequate to raise the pH of the solution to not in excess of 8.5, and the coagulant in an amount adequate to effect complete coagulation.

The reagent and the electrolyte are both preferably added in the form of tenth molar solutions, an exemplary procedure being to first add the reagent (polycyclic compound) and then agitate the solution for three to four minutes, followed by the addition of the electrolyte and a second agitation for a period of from three to four minutes. The calcium hydroxide is then added just sufficient to react with and destroy the excess electrolyte and raise the pH of the solution to 8.5, after which the coagulant is introduced and sufficient agitation effected to bring about complete coagulation. The solution can then be lead to suitable sedimentation tanks or basins.

The treatment will be found to effect over a 98% reduction in the biochemical oxygen demand of the material treated, and to be more economical than prior purification processes, with the further advantage that the sludge product is higher in plant food values.

The foregoing description is explanatory only of the invention, the scope of the same being defined by the appended claims.

Having thus described my invention, what I claim is:—

1. A process for purifying water containing organic matter in both suspended and colloidal form comprising incorporating in the water a polycyclic compound to impart a maximum charge and maximum cataphoretic velocity to the colloids and thereafter flocculating the colloids.

2. A process for purifying water containing organic matter in both suspended and colloidal form comprising incorporating in the water a polycyclic compound to impart a maximum charge and maximum cataphoretic velocity to the colloids, thereafter flocculating the colloids, and finally coagulating the flocculated colloids by introducing to the water a suitable coagulant.

3. A process for purifying water containing organic matter in both suspended and colloidal form comprising incorporating in the water a polycyclic compound to impart a maximum charge and maximum cataphoretic velocity to the colloids, thereafter flocculating the colloids by the addition of a suitable electrolyte, introducing sufficient calcium hydroxide to react with the excess electrolyte and bring the solution to a pH of 8.5, and finally coagulating the flocculated colloids by introducing to the water a suitable coagulant.

4. A process for purifying water containing organic matter in both suspended and colloidal form comprising incorporating in the water a salt of a polycyclic acid, to impart a maximum charge and cataphoretic velocity to the colloids and thereafter flocculating the colloids.

5. A process for purifying water containing organic matter in both suspended and colloidal form comprising incorporating in the water a salt of a polycyclic acid to impart a maximum charge and cataphoretic velocity to the colloids, thereafter flocculating the colloids, introducing sufficient calcium hydroxide to react with the excess electrolyte and bring the solution to a pH of 8.5, and finally coagulating the flocculated colloids by introducing to the water a suitable coagulant.

OLIVER M. URBAIN.